(12) United States Patent
Farris et al.

(10) Patent No.: US 6,620,363 B2
(45) Date of Patent: Sep. 16, 2003

(54) THERMOSET RECYCLING METHODS AND SOLID ARTICLE PRODUCED

(75) Inventors: Richard J. Farris, Leeds, MA (US); Jeremy E. Morin, South Hadley, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 09/919,756

(22) Filed: Aug. 1, 2001

(65) Prior Publication Data

US 2002/0101004 A1 Aug. 1, 2002

Related U.S. Application Data

(60) Provisional application No. 60/222,176, filed on Aug. 1, 2000.

(51) Int. Cl.[7] .................. B29C 47/00; B29C 47/88; C08J 11/00; C08J 11/04
(52) U.S. Cl. .................. 264/211.12; 264/176.1; 264/235; 521/41; 521/44.5
(58) Field of Search .................. 264/109–128, 264/176.1, 211.12, 235; 521/41, 44.5

(56) References Cited

U.S. PATENT DOCUMENTS

| 12,212 | A | | 1/1855 | Morey | |
|---|---|---|---|---|---|
| 4,211,576 | A | * | 7/1980 | Yan | 106/278 |
| 5,385,401 | A | * | 1/1995 | Nath | 366/7 |
| 5,604,277 | A | * | 2/1997 | Osborn | 524/270 |
| 5,904,885 | A | | 5/1999 | Arastoopour et al. | |
| 6,372,807 | B1 | * | 4/2002 | Szekely | 521/40.5 |

OTHER PUBLICATIONS

Accetta et al. (1981) Rubber Chemistry and Technology 55:961–966.
Acetta et al. (1980) Rubber Chemistry and Technology 54:302–310.
Bonner et al. (1998) Plastics, Rubber and Composites Processing and Applications 27(2):58–64.
Corbett et al. (1974) Journal of Cellular Plastics 26–34.
James (1997) Antec 3076–3079.
Law et al. (1997/98) Polymer Recycling 3(4):269–274.
Rosenzweig (1995) John Wiley & Sons Ltd. Excerpts from Chapters 13 and 15.

* cited by examiner

Primary Examiner—Stephen J. Lechert, Jr.
(74) Attorney, Agent, or Firm—Fish & Richardson P.C.

(57) ABSTRACT

The invention provides new methods for recycling thermoset materials such as natural rubbers, synthetic rubbers, silicone rubbers, and other elastomers and cross-linked polymers (e.g., isoprene rubbers; butyl rubbers; ethylene-propylene-diene-rubbers, "EPDM"; nitrile, or acrylonitrile butadiene rubbers, "NBR"; styrene-butadiene rubbers, "SBR"; hard rubbers such as EBONITE®; mixtures of vulcanized rubbers from discarded tires). The invention is based on the discovery that by combining powdered or particulate thermoset materials with lubricants such as aromatic or paraffinic rubber processing oils or volatile solvents, the thermoset materials can be recycled under moderate temperature and pressure conditions to rapidly produce materials having physical properties comparable to those of virgin thermoset materials. The resulting materials can, for example, be extruded or compaction molded into new shapes such as panels. The new recycling methods can also be carried out in either batch or continuous processes.

17 Claims, 6 Drawing Sheets

THERMOSET RECYCLING METHODS AND SOLID ARTICLE PRODUCED

CROSS-REFERENCE TO RELATED APPLICATIONS

This application claims the benefit of U.S. Provisional Application Ser. No. 60/222,176, filed on Aug. 1, 2000.

FIELD OF THE INVENTION

This invention relates to recycling methods, and more particularly to recycling of thermoset materials such as rubber.

BACKGROUND OF THE INVENTION

A need exists for efficient and cost-effective methods for recycling thermoset materials. Because they undergo irreversible chemical changes, termed cross-linking, during processing, thermoset materials are difficult to recycle by conventional methods. Thermosets are generally used in high performance applications, such as in composite materials and tires, and include polyesters, polyurethanes, phenolics, melamines, epoxies, and rubbers.

By volume, the majority of thermosetting polymers comprises the chemically cross-linked rubbers used in tires. Rubber tires also make up a large volume of polymer waste today; in the United States alone, for example, there are an estimated two to three billion tires currently piled up in landfills, with another 250 million tires being discarded annually. In addition to taking up space in landfills, piles of discarded tires represent a major fire and health hazard.

Rubber is among the most difficult of all polymers to recycle, as rubbers have very high molecular weights and are chemically cross-linked, both of which factors render them insoluble and non-meltable. They are also filled with submicron-sized carbon black, which is nearly impossible to separate from the rubber.

Currently, there are few, primarily low technology, uses for materials reclaimed from scrap rubber tires. For example, rubber tires have been cut into sections or strips for use as flooring, mats, vibration and abrasion pads, and shoe soles. Scrap rubber and whole tires have also been burned as a fuel, but their use in this manner is also a source of pollution, since tires generally also include potentially toxic additives in addition to the rubber.

Another method of disposing of tires involves grinding the tires. In a typical grinding process, the steel and polymer fiber reinforcements are recovered from the tires, and the rubber is converted into either a fine particulate, called powder, or a very coarse particulate called crumb. These particulate rubber particles have been used as fillers in asphalt, cements, and roofing materials. Efforts have been made to blend tire powder or crumb into virgin rubber (e.g., at loadings of about 5–10%), but such processes require careful quality control as several different types of rubber are often present in a single tire, and they are not necessarily compatible with one another. For example, the tread, sidewall and inner lining materials usually have different formulations. Crumb rubber has also been used as a bedding material for cattle and hogs, as a replacement for sand in children's playgrounds, and as a component in flooring for athletic tracks and related applications. There are several companies in America grinding tires using either an ambient temperature solvent based process or a cryogenic dry process.

SUMMARY OF THE INVENTION

The invention provides new methods for recycling thermoset materials such as natural rubbers, synthetic rubbers, silicone rubbers, and other elastomers and cross-linked polymers (e.g., isoprene rubbers; butyl rubbers; ethylene-propylene-diene rubbers, "EPDM"; nitrile, or acrylonitrile butadiene rubbers, "NBR"; styrene-butadiene rubbers, "SBR"; hard rubbers such as EBONITEX®; mixtures of vulcanized rubbers from discarded tires). The invention is based on the discovery that by combining powdered or particulate thermoset materials with lubricants such as aromatic or paraffinic rubber processing oils or volatile solvents, the thermoset materials can be recycled under moderate temperature and pressure conditions to rapidly produce materials having physical properties nearing those of virgin thermoset materials. The resulting materials can, for example, be extruded or compaction molded into new shapes such as panels. The new recycling methods can also be carried out in either batch or continuous processes.

According to the new methods, rubber particles subjected to conditions of approximately 15 MPa (about 2200 psi) and 200° C. for one hour form a single piece of rubber with excellent mechanical properties similar to those of virgin rubber. In addition, a solid part can be obtained in 5 minutes under a temperature of 180° C. at about 1500 psi.

In general, the invention features methods for recycling thermoset materials such as rubber. The methods include the steps of adding a lubricant (e.g., a material such as an aromatic oil, a paraffinic oil, a volatile solvent, or a combination of such materials, that makes the thermoset material more processible; the added lubricant can remain in the rubber after processing or can be extracted during or after processing) to thermoset material to be recycled to obtain a lubricated material; and heating the lubricated material under an elevated pressure to obtain the recycled thermoset material.

The thermoset material to be recycled can include, for example, one or more of EPDM rubber, SBR rubber, NBR rubber, natural rubber, silicone rubber, isoprene rubber, and butyl rubber. The rubber can be vulcanized (e.g., cross-linked, particularly via sulfur—sulfur bonds), such as vulcanized rubber derived from discarded tires.

The rubber to be recycled can be, for example, in the form of a powder (e.g., particulate or crumb rubber).

The heating step can be conducted, for example, while the lubricated material is under a pressure of up to 10,000 psi or higher (e.g., 250 psi, 500 psi, 1,000 psi, 1,500 psi, 2,000 psi, 2,500 psi, 3,000 psi, 5,000 psi, 7,500 psi, 10,000 psi, or intermediate pressures such as 500 to 2,500 psi). The temperature can be, for example, between about 100° C. and the decomposition temperature of the rubber (e.g., 100° C., 150° C., 180° C., 200° C., 220° C., 230° C., 240° C., 250° C., or higher, or intermediate pressures such as 180–220° C.). The duration of heating under pressure can be, for example, from about 20 seconds to about 8 hours, e.g., 1 minute, 5 minutes, 10 minutes, 20 minutes, 30 minutes, 60 minutes, 2 hours, 3 hours, or longer, or intermediate times such as 1 to 60 minutes).

Another aspect of the invention features a process for making solid objects (e.g., hard or soft objects, including foam objects) from previously vulcanized rubber. The method includes the steps of obtaining vulcanized rubber ground into a powder; mixing the rubber powder with a lubricant (e.g., aromatic oils, paraffinic oils, and/or volatile solvents) to produce a rubber paste; and feeding the rubber paste into an extruder. The extruder heats the paste under pressure and then extrudes the paste to produce the solid or foam objects.

The process can, for example, be a continuous process. In such a continuous process, the solid objects initially formed can be, for example, green parts, and the process can also include heating the green parts in a post-annealing step (e.g., at ambient or elevated pressure) for a sufficient time (e.g., 20 minutes, 30 minutes, 1 hour, 2 hours, or longer) to produce hardened objects. The paste can, for example, be extruded into a mold, which can optionally be heated. The process can be a ram extrusion process.

The recycled rubber and objects prepared according to these methods and processes are also considered to be an aspect of the invention.

The invention provides several advantages. For example, generally require moderate pressures and temperatures. The new methods can make use of commercially available rubber powder. Since powder obtained by grinding tires already contains the ultra-fine carbon black fillers required to reinforce rubber materials, the use of the powder in the new methods eliminates a processing step.

In the new methods, one minute or less can be adequate time for obtaining a "green" part that can then be post-treated after molding at elevated temperatures for longer periods of time at ambient pressure, even without any powder preheating. The rapidity of production of green parts in the new methods makes them amenable to use in continuous recycling processes, whereas many earlier methods were batch processes.

The new methods allow production of homogeneous materials with excellent mechanical properties.

Since the paste formed by combining rubber powder and extender oil is more liquid-like than rubber powders used alone, even complicated geometries can be molded with relative ease. The new methods also allow used rubbers to be recycled into usable parts such as rubber sheeting, wheelbarrow, pushcart, or bicycle tires, and molded goods, without size limitations. The use of lubricants in the recycling process can also eliminate the need to add plasticizers to the compositions. When thermosets such as vulcanized rubber are ground into a powder, plasticizers can be lost. Also, plasticizers can be lost during the lifetime of rubber products. The addition of lubricants in the new methods can effectively replenish the plasticizers, and thus result in materials having properties similar to virgin thermosets. In the case of rubber powders from old tires, for example, the oil content is generally quite low due to the fact that the oils slowly escape over time, and the use of extender oils as lubricants in the new methods can result in recycled rubber having a composition similar to that of virgin rubber.

Using the methods of the invention, tires can be patched and retreads can be attached to tire bodies by applying heat and pressure, for example, without requiring adhesives.

By allowing used thermoset materials such as discarded tires to be recycled, the new methods can reduce the amount of waste discarded into landfills, lower production costs, reduce energy consumption, and decrease pollution.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION OF THE INVENTION

Figure 1:
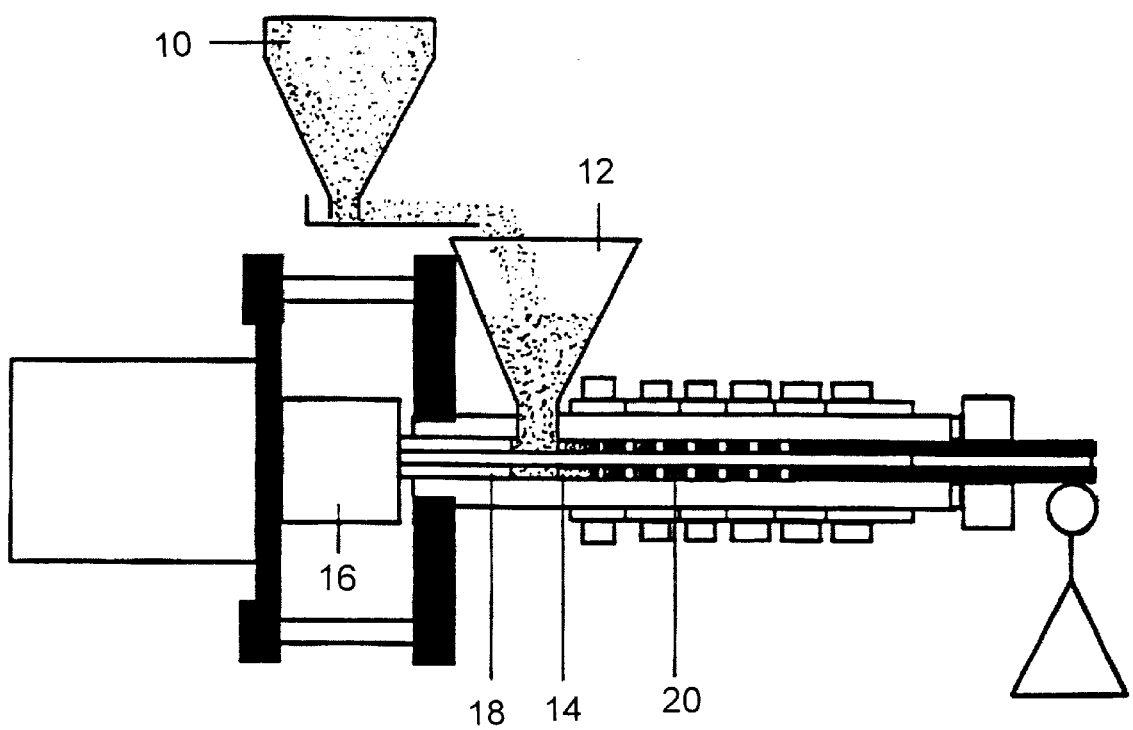
FIG. 1 is a drawing of a ram extrusion apparatus.

The new methods allow thermoset materials such as natural rubbers, synthetic rubbers, silicone rubbers, and other elastomers and cross-linked polymers (e.g., isoprene rubbers, butyl rubbers, EPDM, NBR, SBR, hard rubbers, mixtures of vulcanized rubbers from discarded tires) to be recycled. By combining powdered or particulate thermoset materials with lubricants such as rubber processing oils or solvents, the thermoset materials can be recycled under moderate temperature and pressure conditions to rapidly produce materials having excellent physical properties. The resulting materials can, for example, be extruded or compaction molded into new shapes such as panels. The new recycling methods can also be carried out in either batch or continuous processes.

Preparation of Thermosets for Recycling

"Particles" of any size, including whole pieces (e.g., fan belts, tires, o-rings) can be used in the new methods. However, for ease of handling and efficiency, it is preferred to use powdered or particulate (e.g., "crumb") materials. Ground cross-linked rubber prepared according to the methods described in 1853 by Charles Goodyear (British Patent 2,933), for example, can be used to prepare rubber for recycling. There are also numerous other ways of producing crumb or powdered rubber from tires, depending on the desired end product mesh size and configuration. For example, ambient grinding is accomplished using cracker mills or granulators at room temperature through a shearing and tearing process that creates a rough and spongy particle. Another useful process is cryogenic grinding, which involves cooling the rubber with liquid nitrogen, then fracturing the rubber with a hammer mill. This process produced a powder that has less surface area, due to the clean-faceted fracture surface from the frozen and brittle rubber. Aqueous grinding methods are also used, for example, by Rouse Rubber Industries, Inc. (Miss.). Powders and crumbs of EPDM, SBR, natural rubber, nitrile rubber, neoprene, and whole tire rubber prepared by these and other methods are industrially available in various particle sizes and distributions. For example, Rouse produces powders with six average particle sizes ranging from 44 mm to 174 mm, and also custom grinds rubbers.

In addition to the supply of discarded tires, waste rubber goods are also available for recycling from rubber manufacturers. Ground specialty materials such as fluoroelastomers are also commercially available, for example, from Rouse Polymer Northeast (Woburn, Mass.), and can be recycled using the new methods.

Powders exhibit liquid like properties similar to sand flowing in an hourglass. By taking advantage of this property of powders, we have demonstrated that by using a standard extruder at room temperature, we are able to extrude crumb rubber. The powdered rubber is put into the hopper and powder comes out of the die, proving that pure powder rubber is extrudable even without the addition of a plasticizer or lubricant. By using a standard extruder, a heated mold can be used as a pseudo-injection molding apparatus for cross-linked rubber powders. Additionally, a standard extruder with a heated die can be used to produce cylinders, films, and other extrudable products. The temperature distribution in the screw and barrel zones of the extruder, the time the rubber powder is in the die or the mold, the mold/die temperature, the pressure of the injection step, and the geometries and sizes of the extrudate can be adjusted for greater control over the properties of the products. Optionally, additives such as colorants, flame retardants, oils, catalysts, or other rubber materials can be mixed with the thermoset materials. For example, fluoroelastomer powder can be co-extruded with natural rubber to produce a homogeneous product with good mechanical properties.

The rubber need not be ground up. For example, the new methods can be used to mold together the two faces of a rubber belt. The rubber belt, manufactured by Hoover, had dimensions of ½ inch wide, 1/16 inch thick, and four inch diameter, representing "particles" ~3 inches long and ½ inch thick. The belt was placed in a Carver hydraulic press, heated to 190° C. at a pressure of 4,000 psi for one hour. After sintering, there was no visible interface and peeling tests revealed that the resulting product failed within its thickness, not at the bonding interface.

Without being bound by theory, it is our understanding that in the case of rubbers that include poly- and/or disulfide links, some of the sulfur—sulfur bonds rupture, and the same or different sulfur—sulfur bonds form or reform, during the interchange chemistry. The sulfur-carbon bonds are more stable, and are thus less likely to rupture and/or reform. The methods also work for rubbers that do not include sulfur—sulfur bonds, however, such as fluoroelastomers, polyurethanes, and silicones.

Paste Extrusion

Paste extrusion, a common technique used in processing PTFE, can be used with the new methods to yield a semi-continuous process for recycling rubber or other thermosets into new extruded or molded products. For example, natural rubber powder can be combined with lubricant such as petroleum (paraffinic) oil or aromatic oil (e.g., in a 2:1 ratio) and extruded at modest temperatures (e.g., 160–220° C.) into preformed billets to form "green parts" of a desired shape. The green parts are then coalesced at ambient pressure, usually at a temperature of around 180–220° C. The lubricant remains in the product and acts as a plasticizer.

Ram Extrusion

FIG. 1 is an illustration of a ram extrusion apparatus. The compound is fed by vibrating feeder 10 through hopper 12 and into the compaction zone of die cavity 14; hydraulic actuator 16 drives ram 18 back and forth. On the forward stroke of ram 18, the loose compound in die cavity 14 is pressed against the compacted material at point 20. Ram 18 retreats and more powder fills the empty compaction zone, and the process continues.

Ram extrusion methods can process rubber powders into geometric shapes such as tubes and cylinders (e.g., for use in belts or o-rings). By incorporating a mold at the end of the tube around point 20, the method can be adapted to create a pseudo-injection molding technique, in which hydraulic actuator 16 pushes the rubber powder into the mold and then applies pressure. After a consolidation time (i.e., sufficient time for the newly formed green part to hold its shape), the mold is released, the part is ejected, and the process is continued. The part can then continue through a post-treatment process for final consolidation.

In one experiment, rubber powder was molded at 200° C. for 1 minute and 1250 psi, and tensile strength, modulus, and strain at break for half of this "green" part were measured. The results are shown in the first row of Table 1. The remaining half was put through a post annealing step for 15 hours at 150° C. The mechanical properties of the post-annealed product are shown in the second row of Table 1.

TABLE 1

|  | Tensile Strength (MPa) | Young's Modulus (MPa) | Strain at Break (%) |
| --- | --- | --- | --- |
| Molded powder | 0.40 | 0.90 | 87.59 |
| Post-annealed | 1.41 | 1.18 | 218.82 |

By adjusting mold temperature, consolidation time, mold shape, particle size, and post-treatment conditions, the mechanical properties and other properties (e.g., compressive properties, wear, adhesion, and fracture toughness) of the products can be tailored to a particular application. In general, higher mold temperatures give higher values for mechanical properties such as tensile strength, Young's modulus, and strain at break, up to the rubber's decomposition temperature. Longer consolidation times also increase the values for these mechanical properties, up to around 1–3 hours; after this time, no further change is observed for certain rubbers. These mechanical properties also generally increase with pressure. The effects of temperature, time, and pressure are interrelated, so that, for example, at a constant pressure there is a series of time and temperatures that give similar mechanical properties. Without being bound by any theory, strain at break and tensile strength both have an approximately linear relationship with the natural logarithm of the time (in seconds), multiplied by the sum of the temperature (in degrees C) and the pressure (in pounds per square inch) divided by 50. Thus, MP=ln[time(sec)]*[temperature(C)+pressure(psi)/50].

Figure 2:
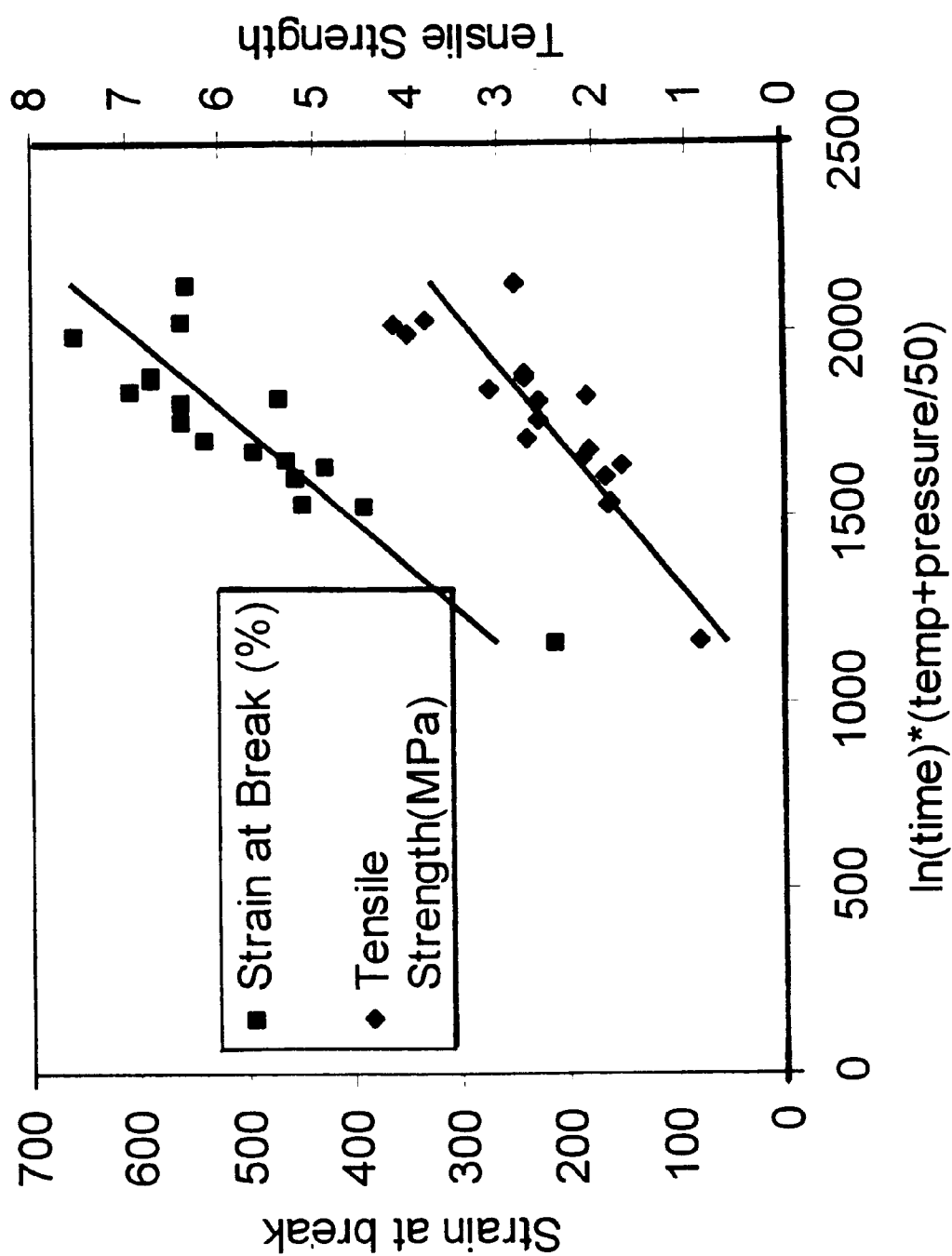
FIG. 2 is a graph of strain at break (left y-axis, %) and tensile strength (right y-axis, MPa) versus ln[time(sec)]*[temperature(C)+pressure(psi)/50 for GF-80 rubber recycled according to the new methods.

For a given rubber material, strain at break and tensile modulus can each be calculated by multiplying MP, as defined above, by a constant, then adding a second constant. The constants can be determined by obtaining two or more data points for each mechanical property. Representative data is shown in FIG. 2, a plot of strain at break (left y-axis, %) and tensile strength (right y-axis, MPa) versus ln[time (sec)]*[temperature(C)+pressure(psi)/50 for GF-80 rubber recycled according to the new methods, as described in Example 1 below. For GF-80, strain at break (%) was found to be approximately equal to (0.4102MP-211.9), with an $R^2$ of 0.7749; tensile strength (MPa) was approximately equal to (0.0032MP-3.1429), with $R^2$=0.745.

Processing methods also affect the mechanical properties of the products. In the manufacture of products using post-annealing methods, very short molding times under pressure can be used, followed by a long post-annealing step at high temperature.

Vulcanized natural rubber with 33% carbon black as used in tires can have a tensile modulus of about 25–35 MPa, a Young's modulus of about 3–8 MPa, and 550–650% strain at break. Vulcanized SBR with 33% carbon black has 17–28 MPa tensile strength, 3–6 MPa Young's modulus, and 400–600% strain at break. Rubber used in rubber bands and other non-tire applications have significantly lower mechanical properties. The mechanical properties are dependent on the vulcanization method, carbon black content, and amount of extending oil used.

Catalysts

Compounds such as elemental sulfur or sodium sulfide that catalyze high temperature chemical exchange reactions can be added to the powdered rubbers to catalyze the solidification of rubber powders via high-pressure, high-temperature fusion. Addition of mercaptans, sodium sulfide, elemental sulfur, peroxides, or other catalysts (e.g., zinc oxide and stearic acid) can also increase the rate of the interchange reaction, and thus decrease molding times. Radiation curing methods can also be employed to accelerate the processes.

There are also other cross-linking agents in the sulfur periodic group (e.g., selenium and tellurium) that can accelerate and induce cross-linking. Selenium and tellurium have been shown to provide shorter cure times and improve some vulcanizate properties such as cross-linking efficiency. Tellurium diethyldithiocarbamate, for example, is the fastest know accelerator for butyl rubber.

Lubricants

By adding a rubber extending oil or other lubricant (e.g., a non-volatile or volatile liquid such as acetone), one can cause a time-delayed diffusion of the lubricant into the rubber, which eliminates the drying step. When rubber is ground, as described above, some if not all of the oil extenders are lost. This oil can be put back into the rubber powder by making pastes. Various other additives such as sulfur, zinc oxide/stearic acid, mercaptans, or other catalysts can help speed up the kinetics of the chemical exchange reaction such as elemental sulfur. By adding various additives the chemical interchange rates can be increased.

Typically, rubber powders contain ~40% carbon black. By adding lubricants, and optionally catalysts and additional vulcanizing agents, new rubber goods can be made from 100% old tire powder. The reprocessed rubber powder can also be used in all the other areas that rubbers are typically used such as shoes, floors, belts and sheeting. Since the rubber powder can be easily processed through powder techniques, new applications can be envisioned (e.g., golf balls cores, hockey pucks, shoe soles, foam inserts, roofing materials, or other molded or extruded goods).

EXAMPLES

The invention is further described in the following examples, which do not limit the scope of the invention described in the claims.

Example 1

We have demonstrated that it is possible to make pastes of rubber powder and extending oils and to then fuse these pastes into solid rubber. Currently we have made pastes in the following ratios of rubber powder to extending oil: 1:1, 2:1, and 3:1. To make the pastes, GF-80 rubber powder (a blend of natural rubber and SBR rubber with a particle distribution between 40 mm and 200 mm) from Rouse Rubber Industries, Inc. was mixed with a paraffinic extending oil $(CH_2CH_2)_n$. These pastes were then molded using the high-pressure high-temperature fusion technique by filling a mold with the paste, putting the mold in a Carver press, and applying 1000 psi pressure and heating to 195° C. for one hour, resulting in solid panels ranging in thickness from 1 to 5 mm. Analysis of the compacted panels gave the following properties:

| Young's Modulus | 1.1 MPa |
| --- | --- |
| Tensile Strength | 4.5 MPa |
| Strain at break | 700% |

These properties make the recycled rubber suitable for numerous applications, including wheelbarrow, pushcart, or bicycle tires, sheeting, roofing materials, mats, and sporting goods (e.g., golf ball cores, hockey pucks, shoe soles). Virgin material of similar composition has a tensile strength of about 15–20 MPa and a strain at break of about 400–500%.

Figure 3:
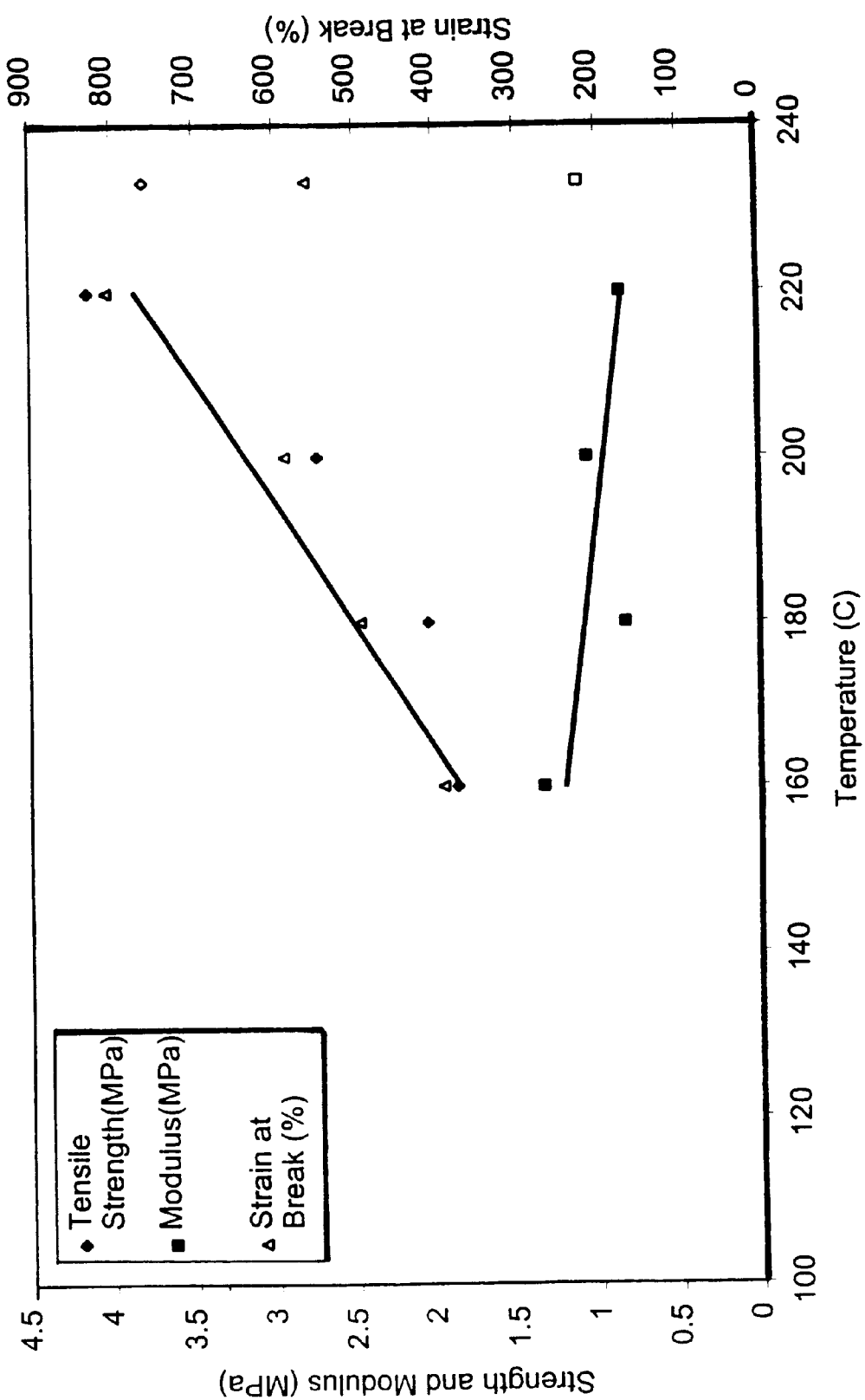
FIG. 3 is a graph of mechanical properties of molded panels made using the new methods as a function of molding temperature.

Thinner or thicker panels can be made, as can other shapes of products. FIG. 3 shows the effect of temperature at constant pressure of 1000 psi and 1 hour heating time. There is an almost linear trend in both tensile strength and strain at break while there is little to no change in the modulus. By increasing the consolidation temperature, one can proceed farther down the "path" of the stress-strain curve also shown in the figure above to the right. This figure shows the effect on the stress-strain curve for rubber compacted at different temperatures. Also in FIG. 3, one can see the maximum tensile strength and strain at break occurs between 220° C. and 230° C.

Figure 4:
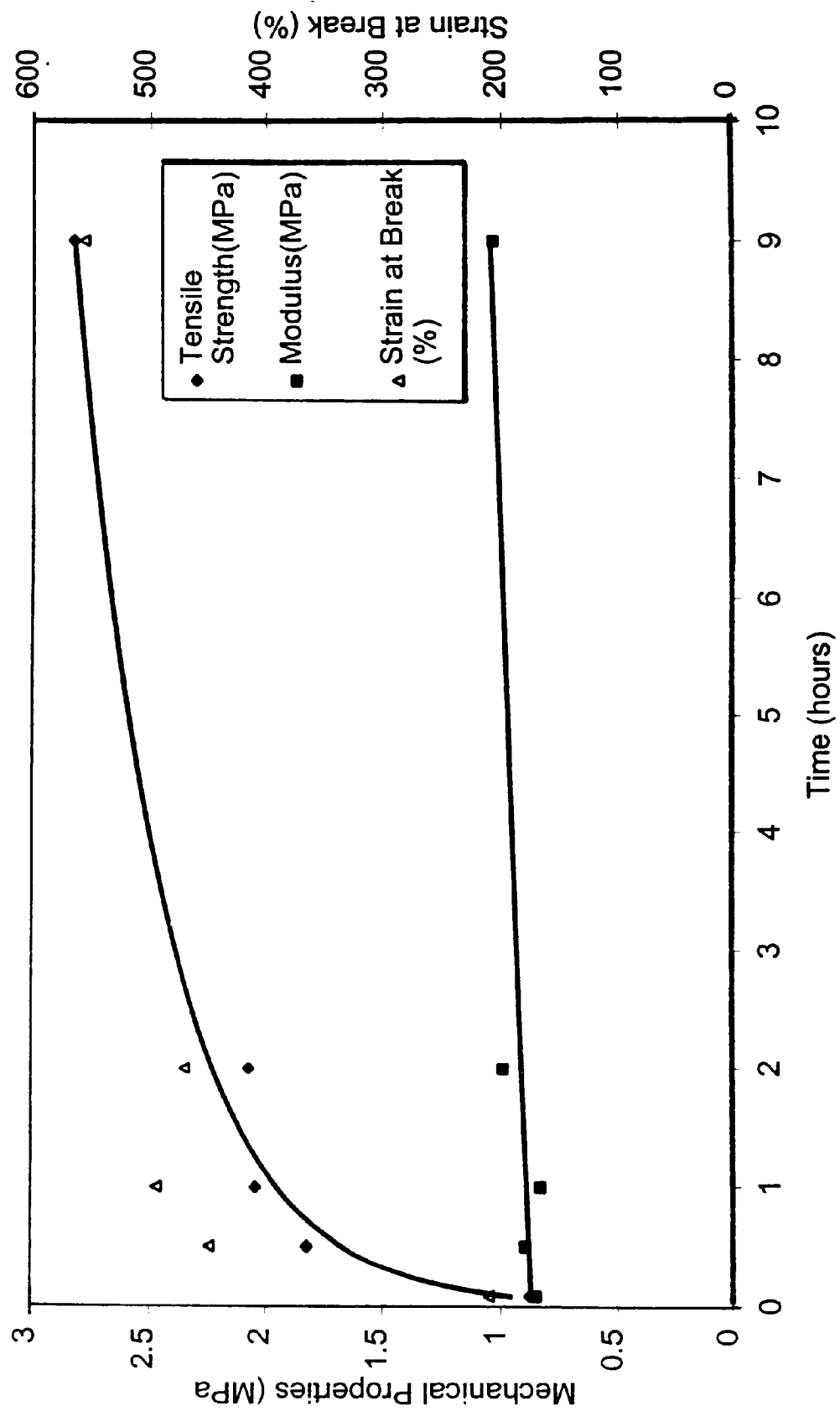
FIG. 4 is a graph of mechanical properties of molded panels made using the new methods as a function of molding time.
Figure 5:
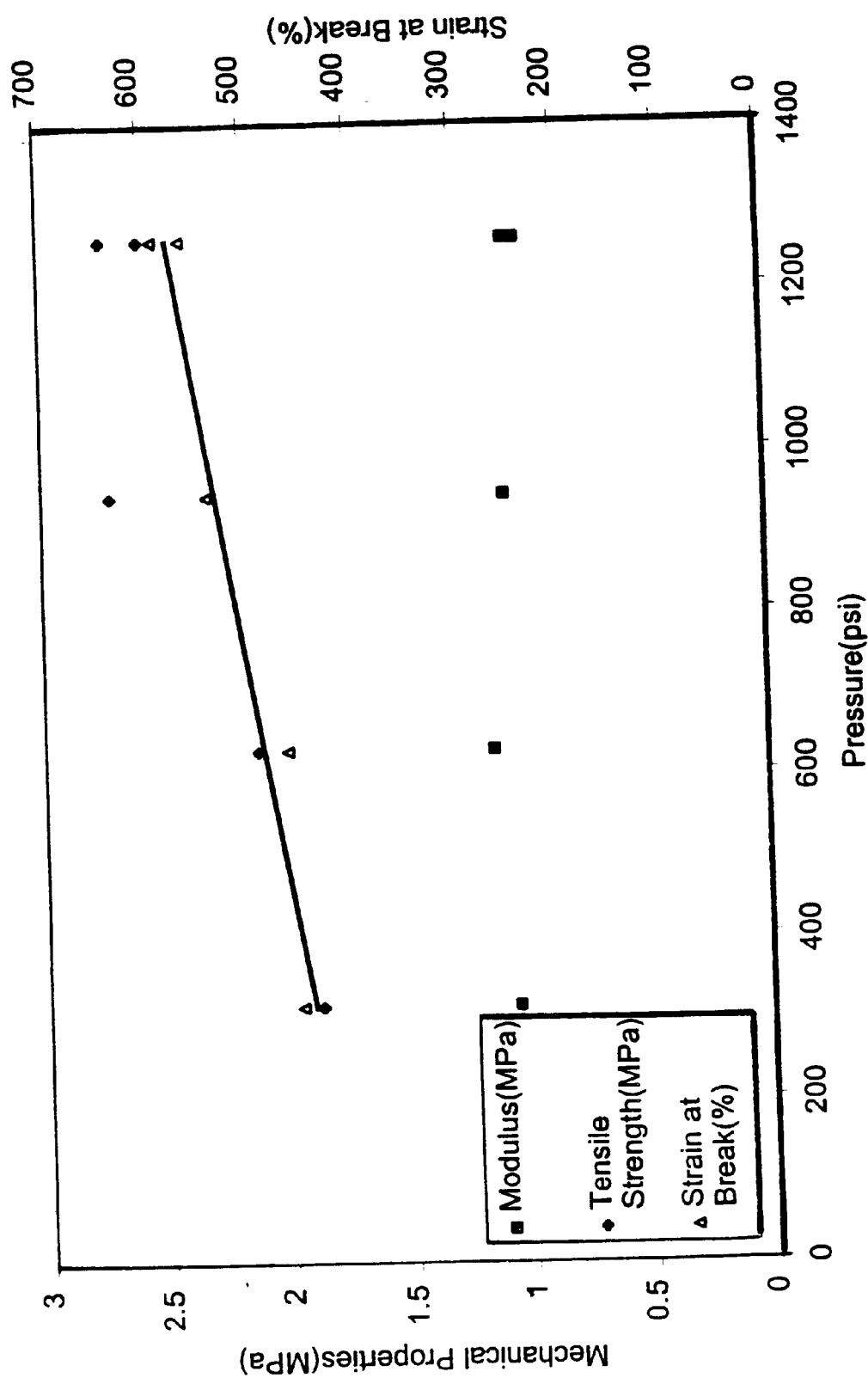
FIG. 5 is a graph of mechanical properties of molded panels made using the new methods as a function of molding pressure.
Figure 6:
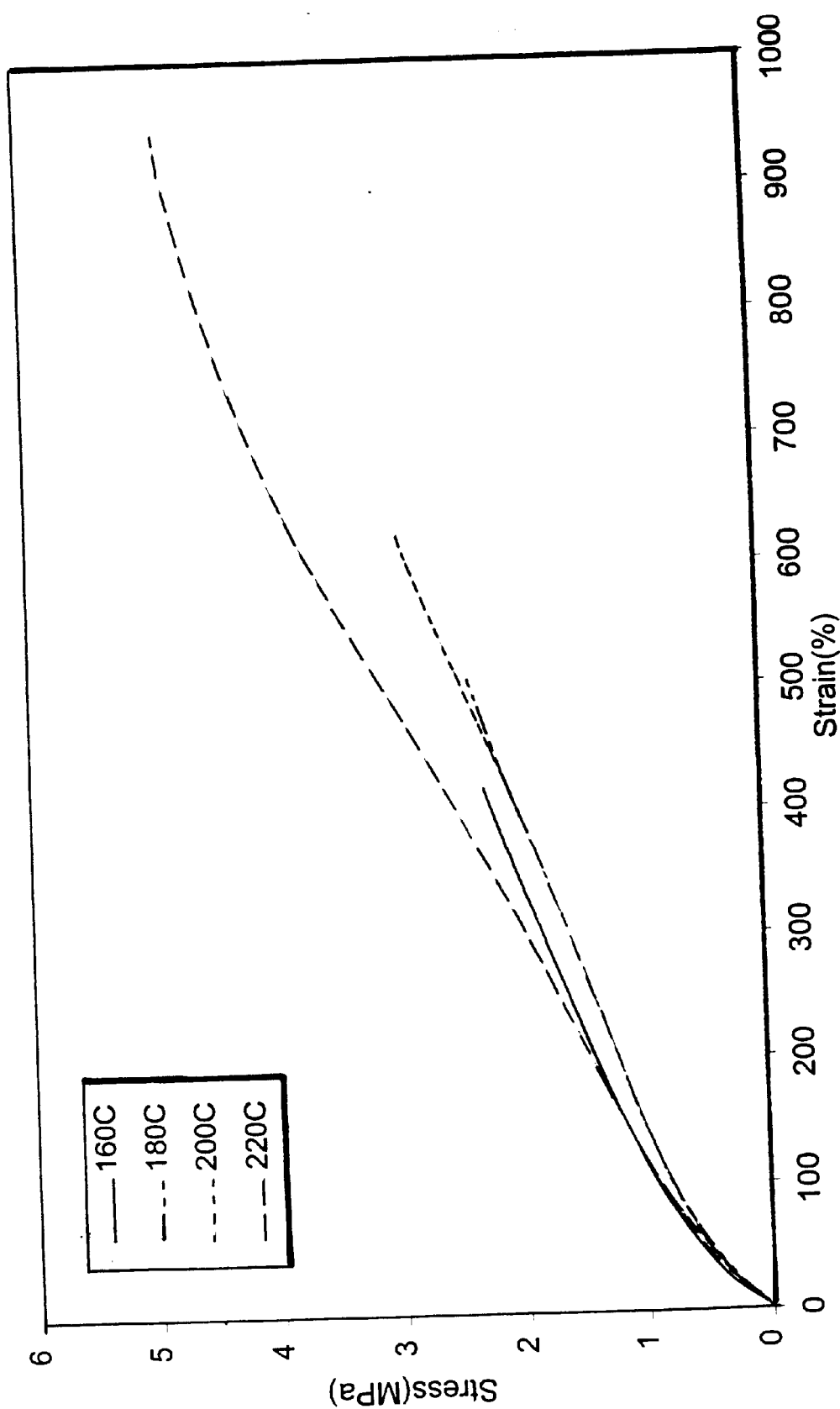
FIG. 6 is a graph of stress-strain of molded panels made using the new methods as a function of molding temperature.

The effects of time and pressure on the recycled material have also been studied. FIG. 4 shows the effect of time at a constant pressure of 1000 psi and 180° C. The ultimate tensile strength and strain at break exhibit a behavior that fits a logarithmic function closely, although these properties should eventually plateau. The Young's modulus increases very slightly as time increases. FIG. 5 shows the effect of pressure at a constant temperature of 200° C. and time of one hour. Again one can see the linear behavior of the ultimate tensile strength and strain at break, although the mechanical properties are not as strongly dependent on pressure when compared to the effect of temperature. Increasing the pressure seems to have little to no effect on the modulus. Finally, FIG. 6 shows "walking" along the stress-strain curve. The term "walking" is used since as the mechanical properties increase, they seem to continue down the same path as the weaker or lower temperature curves. This data indicates that the total cross-link density is not changing but rather the internal damage is simply getting repaired. In other words, the higher temperature fusion can "walk" further up the stress-strain curve. These results are very promising because they indicate that we can recycle rubber and dial in the desired mechanical properties by controlling how far we "walk" down the strain-stress curve.

These results where obtained using an INSTRON Model 5564 and ASTM standard for tensile bars number D638 Type V at a 10% strain rate. The load was measured using a 1 kN load cell and the strain was calculated from the cross-head displacement and the gage length defined by the ASTM standard. The results are an average of eight samples.

Example 2

The solidified panels of Example 1 were subjected to various swelling liquids, including toluene, carbon tetrachloride, and p-xylene. The resulting parts swelled similarly to that of a solid rubber part, indicating that the particles are not simply bonded by network entanglement, since it is expected that swelling would in that case result in unentanglement of the polymer network and the rubber would revert back to a powder, a phenomenon not observed here. After swelling of a SBR/Natural Rubber Blend, molded at 195° C. for 1 hour and 1000 psi with a particle distribution between 40–200 mm (GF-80 from Rouse Rubber Industries Inc), in para-xylene (about 54% by volume), for example, the molded rubber powder retained its mechanically integrity.

The pastes exhibited a much greater ability to flow as shown by a dramatic increase in the amount of flash, the material that squeezed out of the mold, when compared to 100% rubber powder. This increased ability to flow allows for the molding of intricate geometries.

Example 3

Cryo-ground rubber was also obtained from Environmental Processing Systems, and made into a paste by blending the rubber powder with Sundex™ 8125 and Sunpar™ 2280 processing oils (Sun Company, Inc.). Two different concentrations were tested, 1 part rubber powder to 1 part oil (50% oil) and 2 parts rubber powder to 1 part oil (33% oil). Both formed solid pieces when molded into discs and square panels. Pennies and quarters were placed in the molds in order to imprint very fine details into the rubber. The imprinted rubber was found to have the negative image of the coins, with all features and wording clearly distinguishable.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for recycling rubber, the method comprising:
   adding a lubricant to rubber to be recycled to obtain a lubricated material; and
   heating the lubricated material under at least 250 psi to obtain recycled rubber.

2. The method of claim 1, wherein the rubber comprises one or more of ethylene-propylene-diene monomer rubber (EPDM), styrene-butadiene rubber (SBR), nitrile butadiene rubber (NBR), acrylonitrile butadiene rubber, natural rubber, silicone rubber, isoprene rubber, and butyl rubber.

3. The method of claim 1, wherein the rubber comprises vulcanized rubber.

4. The method of claim 3, wherein the vulcanized rubber is derived from discarded tires.

5. The method of claim 1, wherein the rubber to be recycled is in the form of a powder.

6. The method of claim 1, wherein the heating step comprises heating the lubricated material under a pressure of 500 to 2,500 psi.

7. The method of claim 1, wherein the heating step comprises heating the lubricated material to a temperature of between 100° C. and the decomposition temperature of the rubber.

8. The method of claim 1, wherein the lubricant is selected from the group consisting of aromatic oils, paraffinic oils, and volatile solvents.

9. Solid recycled rubber prepared according to the method of claim 1.

10. A process for making solid objects from previously vulcanized rubber, the method comprising:
    obtaining vulcanized rubber ground into a powder;
    mixing the rubber powder with a lubricant to produce a rubber paste; and
    feeding the rubber paste into an extruder, wherein the extruder heats the paste under pressure of at least 250 psi and then extrudes the paste to produce the solid objects.

11. The process of claim 10, wherein the lubricant is selected from the group consisting of aromatic oils, paraffinic oils, and volatile solvents.

12. The process of claim 10, wherein the paste is extruded into a mold.

13. The process of claim 12, wherein the mold is heated.

14. The process of claim 10, wherein the process comprises ram extrusion.

15. A solid rubber object prepared according to the process of claim 10.

16. The process of claim 10, wherein the extruder heats the paste under a pressure of at least 500 to 2500 psi.

17. A continuous process for making solid objects from previously vulcanized rubber, the method comprising:
    obtaining vulcanized rubber ground into a powder;
    mixing the rubber powder with a lubricant to produce a rubber paste;
    feeding the rubber paste into an extruder, wherein the extruder heats the paste under pressure and then extrudes the paste to produce green parts; and
    heating the green parts in a post-annealing step for a sufficient time to produce hardened objects.

* * * * *